(12) United States Patent
Beuerle et al.

(10) Patent No.: US 11,167,536 B2
(45) Date of Patent: *Nov. 9, 2021

(54) MULTILAYER THERMOPLASTIC ARTICLES WITH IMPROVED RECYCLABILITY

(71) Applicant: AMCOR RIGID PACKAGING USA, LLC, Wilmington, DE (US)

(72) Inventors: Frederick C. Beuerle, Jackson, MI (US); Dan Witham, Manchester, MI (US); John Brace, Saline, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,034

(22) Filed: Oct. 26, 2020

(65) Prior Publication Data

US 2021/0039367 A1 Feb. 11, 2021

Related U.S. Application Data

(63) Continuation of application No. PCT/US2018/029948, filed on Apr. 27, 2018.

(51) Int. Cl.
*B32B 27/08* (2006.01)
*B32B 27/18* (2006.01)
(Continued)

(52) U.S. Cl.
CPC .............. *B32B 27/08* (2013.01); *B32B 27/18* (2013.01); *B32B 27/20* (2013.01); *B32B 27/288* (2013.01);
(Continued)

(58) Field of Classification Search
CPC ......... B32B 27/08; B32B 27/18; B32B 27/32; B32B 27/36; B32B 37/144; B32B 27/288;
(Continued)

(56) References Cited

U.S. PATENT DOCUMENTS 6,245,437 B1 6/2001 Shiiki et al.
6,949,254 B2 9/2005 Gen
(Continued)

FOREIGN PATENT DOCUMENTS

WO 2013078174 A2 5/2013

OTHER PUBLICATIONS

"Hydrolysis and Biodegradation or Poly(lactic acid)," Gorrasi et al., May 28, 2017.*

(Continued)

*Primary Examiner* — Michael C Miggins
(74) *Attorney, Agent, or Firm* — Harness, Dickey & Pierce, P.L.C.

(57) ABSTRACT

A multilayer thermoplastic article blended with hydrolytically unstable polymers and a material component for improved recyclability. The multilayer thermoplastic article having an inner layer being made of a thermoplastic material, an outer layer being made of a thermoplastic material, and an intermediate layer disposed between the inner layer and the outer layer. The intermediate layer is made of a blended material comprising 50 to 99 wt. % of a hydrolytically unstable polymer and 1 to 50 wt. % of the material component selected from the group consisting of an oxygen scavenger, an oxidizable organic polymer, a passive barrier material, Iron, Ascorbic Acid, and potassium sulfite.

10 Claims, 7 Drawing Sheets

(51) Int. Cl.
　　　B32B 27/32　　(2006.01)
　　　B32B 27/36　　(2006.01)
　　　B32B 37/14　　(2006.01)
　　　B32B 27/28　　(2006.01)
　　　B32B 27/20　　(2006.01)
　　　C08L 67/04　　(2006.01)
(52) U.S. Cl.
　　　CPC .............. *B32B 27/32* (2013.01); *B32B 27/36* (2013.01); *B32B 27/365* (2013.01); *B32B 37/144* (2013.01); *C08L 67/04* (2013.01); *B32B 2250/03* (2013.01); *B32B 2250/24* (2013.01); *B32B 2270/00* (2013.01); *B32B 2272/00* (2013.01); *B32B 2274/00* (2013.01); *B32B 2307/7166* (2013.01); *B32B 2307/7242* (2013.01); *B32B 2307/74* (2013.01); *B32B 2323/04* (2013.01); *B32B 2333/12* (2013.01); *B32B 2367/00* (2013.01); *B32B 2371/00* (2013.01); *B32B 2439/60* (2013.01); *B32B 2439/70* (2013.01)
(58) Field of Classification Search
　　　CPC ... B32B 27/365; B32B 27/20; B32B 2250/03; B32B 2272/00; B32B 2274/00; B32B 2307/7166; B32B 2307/7242; B32B 2307/74; B32B 2307/04; B32B 2333/12; B32B 2367/00; B32B 2371/00; B32B 2439/60; B32B 2439/70; B32B 2250/24; B32B 2270/00; C08L 67/04

See application file for complete search history.

(56) References Cited

U.S. PATENT DOCUMENTS

| | | | |
|---|---|---|---|
| 2002/0081358 A1* | 6/2002 | Galland | A23L 3/3436 426/398 |
| 2003/0003197 A1 | 1/2003 | Berlin et al. | |
| 2007/0193643 A1 | 8/2007 | Jarvenkyla | |
| 2009/0274920 A1 | 11/2009 | Li et al. | |
| 2009/0286023 A1 | 11/2009 | Dobreski et al. | |
| 2011/0200827 A1 | 8/2011 | Hutchinson et al. | |
| 2011/0281125 A1 | 11/2011 | Chau et al. | |
| 2013/0095265 A1* | 4/2013 | Mitadera | B29C 49/221 428/36.7 |
| 2016/0230046 A1 | 8/2016 | Vinci et al. | |
| 2016/0257098 A1 | 9/2016 | Nissenbaum et al. | |
| 2017/0259486 A1 | 9/2017 | Koerner et al. | |

OTHER PUBLICATIONS

"Hydrolysis and Biodegradation of Poly(lactic acid)," Gorrasi et al., May 28, 2017.

* cited by examiner

| Polymer | Melting Point (°C) | Glass Transition Temp (°C) | Modulus (Gpa)[a] | Degradation Time (Months)[b] |
|---|---|---|---|---|
| PGA | 225-230 | 35-40 | 7.0 | 6 to 12 |
| LPLA | 173-178 | 60-65 | 2.7 | >24 |
| DLPLA | Amorphous | 55-60 | 1.9 | 12 to 16 |
| PCL | 58-63 | (-65)-(-60) | 0.4 | >24 |
| PDO | N/A | (-10)-0 | 1.5 | 6 to 12 |
| PGA-TMC | N/A | N/A | 2.4 | 6 to 12 |
| 85/15 DLPLG | Amorphous | 50-55 | 2.0 | 5 to 6 |
| 75/25 DLPLG | Amorphous | 50-55 | 2.0 | 4 to 5 |
| 65/35 DLPLG | Amorphous | 45-50 | 2.0 | 3 to 4 |
| 50/50 DLPLG | Amorphous | 45-50 | 2.0 | 1 to 2 | a. Tensile or Flexural Modulus.
b. Time to Complete Mass Loss. Rate also Depends on Part Geometry

*Fig-3*

Concentrated O₂ Scavenger/PGA Blend in Multilayer [1.0 L 26g Container, Monolayer vs. 4% Barrier Layer]

| | Monolayer (PET/scavenger Blend) | Multilayer (PET/scavenger Blend in B Layer) | | | Multilayer (PGA/scavenger Blend in B Layer) | |
|---|---|---|---|---|---|---|
| Construction: | 100% A | 30% A; 4% B; 66% A | | | 30% A; 4% B; 66% A | |
| Layer % Thickness/ Placement | | | | | | |
| Wt% PGA | 0.00 | 0.00 | 0.00 | 0.00 | 3.60 | 3.20 | 3.00 |
| Wt% PTMEG Scavenger (Ultimate Scavenging Capacity (Q) = 120 ccO2/g† | 1.00 | 0.40 [10%scav/ 90%PET] | 0.80 [20%scav/ 80%PET] | 1.00 [25%scav/ 75%PET] | 0.40 [10%scav/ 90%PGA] | 0.80 [20%scav/ 80%PGA] | 1.00 [25%scav/ 75%PGA] |
| Barrier Performance @ 23°C/50%RH [1.0 L, 100 in 2, 10.0 ml Container Format, 60 Days Empty Bottle Storage Time (EBST) Impermeable Cap] | | | | | | | |
| OTR cc/pkg-day @30 Days | 0.089 | 0.071 | 0.082 | 0.060 | 0.049 | 0.024 | 0.016 | 0.015 |
| Ingress ppm/yr O2 | 43.7 | 43.6 | 43.6 | 39.5 | 38.6 | 17.3 | 17.4 | 17.0 |
| Days to 10 ppm Ingress | 78 | 94 | 85 | 109 | 127 | 125 | 245 | 259 |
| Days to 2 ppm dO2 | 14 | 23 | 17 | 31 | 46 | 61 | 113 | 144 |
| WVTR g/pkg-yr | 11.2 | 11.5 | 11.6 | 11.6 | 11.7 | 5.2 | 6.5 | 7.1 |
| Recycling (Residuals in PET Stream @ 99% Wash Efficiency)... | | | | | | | |
| Wt % PGA | | | | | | 0.036 | 0.032 | 0.030 |
| Wt % scav | | | | | | 0.004 | 0.008 | 0.010 |
| Recycling (Residuals in PET Stream @ 90% Wash Efficiency)... | | | | | | | |
| Wt % PGA | | | | | | 0.360 | 0.320 | 0.300 |
| Wt % scav | | | | | | 0.040 | 0.080 | 0.100 |

Fig-4

Concentrated O₂ Scavenger/PGA Blend in Multilayer [187 mL, 22.5g Container, Monolayer vs. 4% Barrier Layer]

| Construction... | Monolayer (PET/scavenger Blend) | Multilayer (PET/scavenger Blend in B Layer) | | | Multilayer (PGA/scavenger Blend in B Layer) | |
|---|---|---|---|---|---|---|
| Layer % Thickness/ Placement | 100% A | 30% A, 4% B, 66% A | | | 30% A, 4% B, 66% A | |
| Wt% PGA | 0.00 | 0.00 | 0.00 | 0.00 | 3.60 | 3.20 | 3.00 |
| Wt% PTMEG Scavenger (Ultimate Scavenging Capacity (O₂) = 120 ccO₂/g)* | 0.80 | 1.00 [10%scav/ 90%PET] | 0.60 [20%scav/ 80%PET] | 1.00 [25%scav/ 75%PET] | 0.40 [10%scav/ 90%PGA] | 0.80 [20%scav/ 80%PGA] | 1.00 [25%scav/ 75%PGA] |
| Barrier Performance @ 23°C/50%RH [187 mL, 32.57 in², 23.0 mL Container Format, 60 days Empty Bottle Storage Time (EBST), Impermeable Cap] | | | | | | |
| OTR cc/pkg-day @30 Days | 0.0012 | 0.0002 | 0.0031 | 0.0008 | 0.0007 | 0.0007 | 0.00004 | 0.00003 |
| Ingress ppm/yr O₂ | 14.2 | 8.0 | 11.9 | 3.2 | 2.2 | 0.6 | 0.3 | 0.3 |
| Days to 5 ppm Ingress | 223 | 304 | 200 | >>365 | >>365 | >>365 | >>365 | >>365 |
| Days to 2 ppm dO₂ | 262 | >365 | 312 | >>365 | >>365 | >>365 | >>365 | >>365 |
| WVTR g/pkg-yr | 1.8 | 1.8 | 1.8 | 1.8 | 0.7 | 0.9 | 1.0 |
| Recycling (Residuals in PET Stream @ 99% Wash Efficiency)... | | | | | | |
| Wt % PGA | | | | | 0.036 | 0.032 | 0.030 |
| Wt % scav | | | | | 0.004 | 0.008 | 0.010 |
| Recycling (Residuals in PET Stream @ 80% Wash Efficiency)... | | | | | | |
| Wt % PGA | | | | | 0.360 | 0.320 | 0.300 |
| Wt % scav | | | | | 0.040 | 0.080 | 0.100 |

Fig-5

Concentrated O₂ Scavenger/PGA Blend in Multilayer [187 mL, 22.5g Container, Monolayer vs. 2% Barrier Layer]

| Construction... | Monolayer (PET/scavenger Blend) | Multilayer (PET/scavenger Blend in B Layer) | Multilayer (PET/scavenger Blend in B Layer) | Multilayer (PET/scavenger Blend in B Layer) | Multilayer (PGA/scavenger Blend in B Layer) | Multilayer (PGA/scavenger Blend in B Layer) |
|---|---|---|---|---|---|---|
| Layer % Thickness / Placement | 100% A | 30% A, 2% B, 68% A | 30% A, 2% B, 68% A | 30% A, 2% B, 68% A | 30% A, 2% B, 68% A | 30% A, 2% B, 68% A |
| Wt% PGA | 0.00 | 0.00 | 0.00 | 0.00 | 1.60 | 1.50 |
| Wt% PTMEG Scavenger (Ultimate Scavenging Capacity (C) = 120 ccO₂/g)* | 0.50 | 0.20 [10%scav/ 90%PET] | 0.40 [20%scav/ 80%PET] | 0.50 [25%scav/ 75%PET] | 0.40 [20%scav/ 80%PGA] | 0.50 [25%scav/ 75%PGA] |
| Barrier Performance @ 23°C/50%RH [187 mL, 32.57 in², 23.0 mil Container Format, 60 days Empty Bottle Storage Time (EBST), Impermeable Cap] | | | | | | |
| OTR cc/pkg-day @30 Days | 0.0139 | 0.007 | 0.003 | 0.002 | 0.0015 | 0.0005 | 0.004 |
| Ingress ppm/yr O₂ | 36.7 | 27.6 | 12.2 | 8.1 | 9.3 | 3.2 | 2.2 |
| Days to 5 ppm Ingress | 43 | 88 | 169 | 252 | 256 | >365 | >365 |
| Days to 2 ppm dO₂ | 17 | 78 | 314 | >365 | 244 | >365 | >365 |
| WVTR g/pkg-yr | 1.8 | 1.8 | 1.8 | 1.8 | 1.1 | 1.2 | 1.3 |
| Recycling (Residuals in PET Stream @ 99% Wash Efficiency)... | | | | | | |
| Wt % PGA | | | | | 0.018 | 0.016 | 0.015 |
| Wt % scav | | | | | 0.002 | 0.004 | 0.005 |
| Recycling (Residuals in PET Stream @ 90% Wash Efficiency)... | | | | | | |
| Wt % PGA | | | | | 0.180 | 0.160 | 0.150 |
| Wt % scav | | | | | 0.020 | 0.040 | 0.050 |

Fig-6

Concentrated O₂ Scavenger/PGA Blend in Multilayer [750 mL 47g Container, Monolayer vs. 1% Barrier Layer]

| Construction… | Monolayer (PET/scavenger Blend) | Multilayer (PET/scavenger Blend in B Layer) | | | Multilayer (PGA/scavenger Blend in B Layer) | | |
|---|---|---|---|---|---|---|---|
| Layer % Thickness/ Placement | 100% A | 30% A:1% B:69% A | | | 30% A:1% B:69% A | | |
| Wt % PGA | 0.00 | 0.00 | 0.00 | 0.00 | 0.90 | 0.80 | 0.75 |
| Wt % PTMEG Scavenger (Ultimate Scavenging Capacity (C) = 120 cc(O₂)/g) | 0.25 | 0.10 [10%scav/ 90%PET] | 0.20 [20%scav/ 80%PET] | 0.25 [25%scav/ 75%PET] | 0.10 [10%scav/ 90%PGA] | 0.20 [20%scav/ 80%PGA] | 0.25 [25%scav/ 75%PGA] |
| Barrier Performance @ 23 °C/50%RH [750 mL, 82.15 in², 23.5 mil Container Format, 60 days Empty Bottle Storage Time (EBST), Impermeable Cap] | | | | | | | |
| OTR cc/pkg-day @30 Days | 0.036 | 0.026 | 0.029 | 0.019 | 0.015 | 0.017 | 0.010 | 0.009 |
| Ingress ppm/yr O₂ | 23.3 | 21.1 | 22.0 | 17.9 | 15.3 | 14.6 | 12.3 | 10.7 |
| Days to 5 ppm Ingress | 72 | 97 | 87 | 129 | 157 | 139 | 150 | 222 |
| Days to 2 ppm of O₂ | 26 | 46 | 42 | 92 | 128 | 73 | 147 | 197 |
| Wt/R g/pkg/yr | 4.5 | 4.4 | 4.5 | 4.5 | 4.5 | 3.4 | 3.7 | 3.8 |
| Recycling (Residuals in PET Stream @ 99% Wash Efficiency)… | | | | | | | | |
| Wt % PGA | | | | | | 0.09 | 0.08 | 0.0075 |
| Wt % scav | | | | | | 0.001 | 0.002 | 0.0025 |
| Recycling (Residuals in PET Stream @ 90% Wash Efficiency)… | | | | | | | | |
| Wt % PGA | | | | | | 0.09 | 0.08 | 0.075 |
| Wt % scav | | | | | | 0.01 | 0.02 | 0.025 |

Fig-7

MULTILAYER THERMOPLASTIC ARTICLES WITH IMPROVED RECYCLABILITY

CROSS-REFERENCE TO RELATED APPLICATIONS

This application is a continuation of International Application No. PCT/US2018/029948, filed Apr. 27, 2018. The entire disclosure is incorporated herein by reference.

FIELD

The present disclosure relates to multilayer thermoplastic articles with improved recyclability and, more particularly, relates to multilayer thermoplastic articles blended with hydrolytically unstable gas barrier polymers and a material component for improved recyclability.

BACKGROUND AND SUMMARY

This section provides background information related to the present disclosure which is not necessarily prior art. This section also provides a general summary of the disclosure, and is not a comprehensive disclosure of its full scope or all of its features.

Plastic is a popular building material of modern human culture, which is used in a wide variety of applications and products. Because of its ubiquitous nature, plastic was typically used and discarded into landfills. Unfortunately, because of its material structure, it is believed to require centuries to fully decompose. Therefore, for many decades, there has been both social desire and government regulation regarding recycling of plastic material.

Generally, because of its material longevity, plastic can be recycled and reused in new products, thereby reducing the need and space associated with disposal. Recycling became more feasible in the 1980s and 1990s with the development and use of Polyethylene Terephthalate (PET) and other plastic materials.

Generally, plastic recycling requires sorting the plastic by the type of resin that is in their structure (seven basic types) and, in some cases, by color. The plastic is then chopped into small pieces, cleaned to remove debris and residue typically using a strong caustic (hydroxide) solution, melted down, and sometimes re-extruded into pellets. These small pellets are then transported to plastic processing plants where they are introduced and, sometimes, combined with virgin plastic material during the manufacturing process.

Unfortunately, the caustic wash solution can only remove impurities or additives that are soluble or dispersible in (alkaline) aqueous solution. Many modern plastics are combined with dyes, fillers, oxygen scavengers, colorants, passive barrier materials, and the like (collectively referred to as additives) that are often added to plastic during the manufacturing process for consumer and/or product considerations. In many cases, these additives are not easily recyclable and may complicate and/or prohibit proper recycling of the plastic material.

Accordingly, there is a need in the relevant art to provide improved plastic recycling compatibility. Moreover, there is a need in the relevant art to provide improved plastic material compositions that aid in plastic recycling. Still further, there is a need in the relevant art to permit the addition of material components for improved consumer and/or product consideration without negatively affecting compatibility of the plastic material for recycling.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a table illustrating Hydrolytically Unstable Polymers that are particularly adapted for use in connection with the principles of the present teachings.

Figure 1:
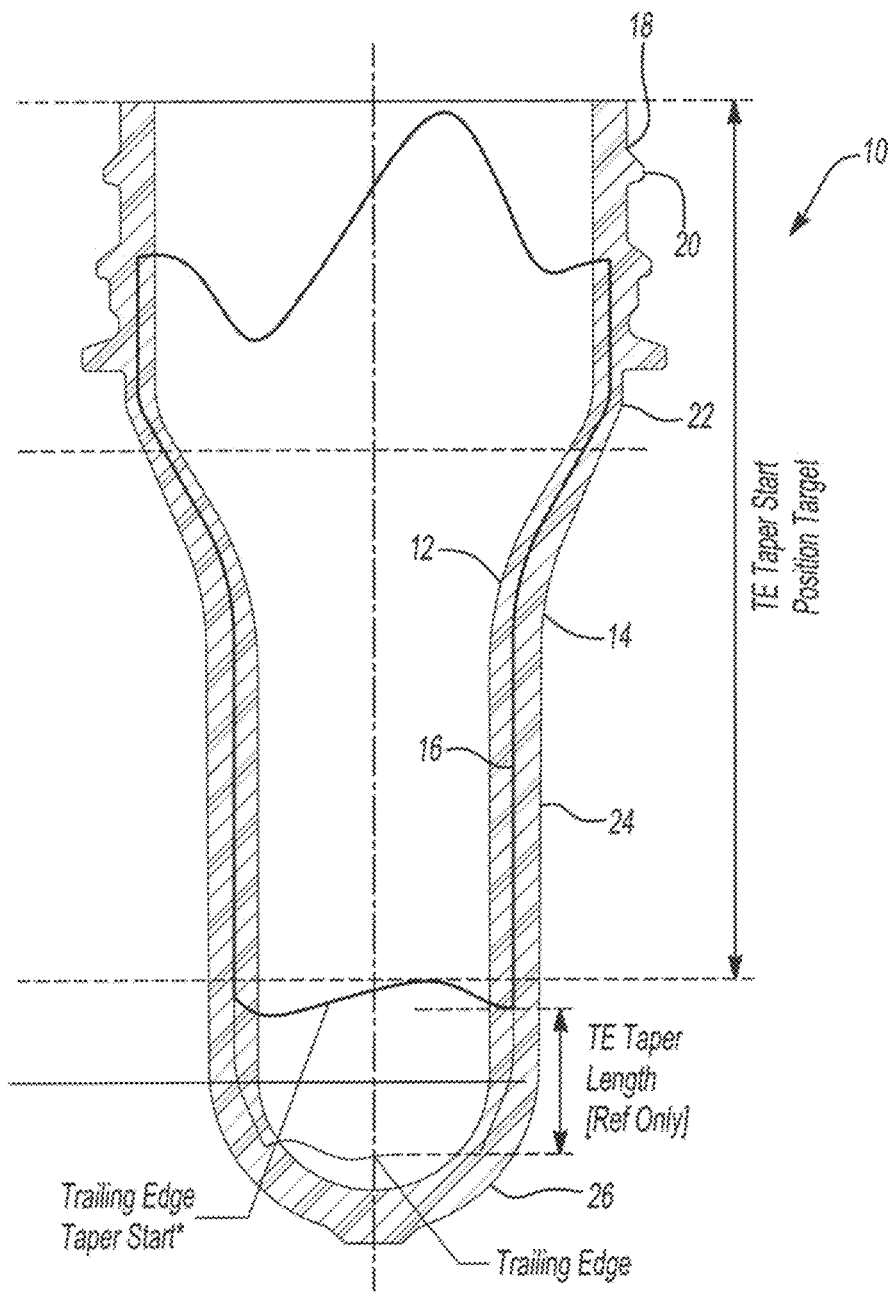
FIG. 1 is a cross-sectional view illustrating a preform for use in blowmolding a plastic container according to the principles of the present teachings.

FIG. 4 is a data table relating to a thin-wall, medium-size format container (e.g. a carbonated soft drink (CSD) container, 1.0 L 26 g container) illustrating performance characteristics for a concentrated $O_2$ scavenger and blend component used in a monolayer PET/scavenger blend, a multilayer PET/scavenger with 4% thickness barrier layer, and a multilayer PGA/scavenger blend with 4% thickness barrier layer as calculated by M-RULE® modeling.

FIG. 5 is a data table relating to a heavy-wall, small-size format container (e.g. a small wine container, 187 mL 22.5 g container) illustrating performance characteristics for a concentrated $O_2$ scavenger and blend component used in a monolayer PET/scavenger blend, a multilayer PET/scavenger with 4% thickness barrier layer, and a multilayer PGA/scavenger blend with 4% thickness barrier layer as calculated by M-RULE® modeling.

FIG. 6 is a data table relating to a heavy-wall, small-size format container (e.g. a small wine container, 187 mL 22.5 g container) illustrating performance characteristics for a concentrated $O_2$ scavenger and blend component used in a monolayer PET/scavenger blend, a multilayer PET/scavenger with 2% thickness barrier layer, and a multilayer PGA/scavenger blend with 2% thickness barrier layer as calculated by M-RULE® modeling.

FIG. 7 is a data table relating to a heavy-wall, medium-size format container (e.g. a large wine container, 750 mL 47 g container) illustrating performance characteristics for a concentrated $O_2$ scavenger and blend component used in a monolayer PET/scavenger blend, a multilayer PET/scavenger with 1% thickness barrier layer, and a multilayer PGA/scavenger blend with 1% thickness barrier layer as calculated by M-RULE® modeling.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

According to the principles of the present teachings, plastic products, such as multilayer containers, are provided having improved recyclability. In particular, in some embodiments, the plastic products and method of manufacturing the same have barrier and/or material components blended with hydrolytically unstable gas barrier polymers for improved recyclability. Although the present teachings are described in connection with the manufacturing of plastic container products, it should be understood that the principles of the present teachings are not limited to such and are equally applicable to a wide variety of plastic products, goods, and materials.

Traditionally, in the food container industry, additives, such as oxygen scavengers, colorants, and the like, are blended directly with the base thermoplastic material (e.g. PET) which may result in unwanted contamination of the recycle stream. That is, many of these additives, which are used for improved performance of the container, are difficult to separate from the base thermoplastic material (e.g. PET) and thus require complex and/or expensive recycling procedures.

However, in order to permit the use of such additives with base thermoplastic material but without adversely affecting the recycle processing of the discarded plastic, the present teachings employ plastics having hydrolytically unstable high barrier polyester incorporated into the initial container material blend. The hydrolytically unstable high barrier according to the present teachings includes materials synthesized from glycolic acid (e.g. Polyglycolic Acid (PGA)), and other polymers, including materials synthesized from lactic acid or $\alpha$-Hydroxy acids. According to these compositions, the resultant polymer chain reacts with water in strong alkaline solution and readily breaks down during the recycling process without unnecessarily complex and expensive materials or processes. More particularly, hydrolytic instability results in biodegradability and/or elimination during plastic recycling processes.

In some embodiments, PGA rapidly hydrolyzes in alkali wash water conditions ensuring that—unlike other barrier polymer alternatives—it can be chemically separated during the washing of PET flake, which will be further discussed in connection with the data set forth herein. PGA has been proven compatible with industrial PET recycling processes. In fact, PGA is easily dissolved in the alkaline wash water stages of rPET processing, assuring a simple and complete chemical separation of PGA from the valued rPET flake.

Hydrolytically unstable high barrier polyester, such as PGA, can be readily extruded and molded in combination with PET, polypropylene (PP), polyethylene (PE), Polylactic Acid (PLA), and other common polymers into multilayer structures on conventional processing equipment. However, for multilayer extrusion and injection, one must ensure that melt-stream properties of PGA or PGA/scavenger or PGA/colorant are compatible with the preferred process (melt viscosities, etc.). Additionally, further well-known material selection criteria for obtaining mechanically stable multilayer structures must be considered, for example adhesion of the PGA layer or PGA/scavenger blend layer to the structural layer(s) in the quenched article during service life. Without being bound by a particular theory, virgin PGA of relatively high polarity is expected to adhere well to polyester PET but poorly to nonpolar polyolefins and PGA/scavenger or PGA/colorant blends will have altered adhesion characteristics to consider.

It has been found that incorporating material components (e.g. oxygen scavengers, colorants) within the hydrolytically unstable polymer of the present teachings enables most, or all, of the material components to be removed with the hydrolytically unstable polymer during recycling or material washing. These material components, including scavengers and passive barrier materials would otherwise contaminate the recycle stream if incorporated directly into the PET material. In some embodiments, it has been found that the melt temperature of the hydrolytically unstable polymer and other material components can be substantially equal to facilitate the aforementioned multilayer extrusion.

Exemplary material components that are easily removed in accordance with these teachings include $O_2$ scavengers or oxidizable organic polymers in the presence of a transition metal catalyst (e.g. cobalt stearate). Such oxidizable organic polymers may include polybutadiene; oxidizable polyamide materials such as MXD6; or poly(alkylene ether); PTMEG; unsaturated hydrocarbons; MXB_class including MXBT or m-xylylene-bis-(tetrahydrophthalimide). Other scavenging materials include Iron, Ascorbic Acid, oxidizable polymers, potassium sulfite. Other additives, such as colorants, can also be combined with the hydrolytically unstable high barrier polyester of the present teachings.

Exemplary hydrolytically unstable polymers that can be used in connection with the principles of the present teachings are illustrated in FIG. 3, PGA polymer is strongly preferred because of its very high gas barrier to CO2 and O2. In some embodiments, hydrolytically unstable polymer is selected from the group consisting of polycaprolactone (PCL), polydioxanone (PDO), polyglycolide trimethylene carbonate (PGA TMC), DL-polylactide-co-glycolide (DLPLG).

With particular reference to FIG. 1, the present teachings can be used in connection with the production of food and beverage containers. Traditionally, plastic containers are manufactured using a preform 10 that is blow molded in a conventional manner and that is constructed in accordance with the principles of the present teachings. Although the present teachings will be discussed in connection with preform 10, it should be understood that the principles of the present teachings are applicable to a wide variety of thermoplastic products and is not merely limited to food or beverage containers or products, but is equally applicable to any multilayer thermoplastic article.

In some embodiments, preform 10 comprises a conventional preform shape being made of a multilayer assembly.

The multilayer assembly can comprise an inner layer 12, an outer layer 14, and an intermediate layer 16 disposed between the inner layer 12 and the outer layer 14. In some embodiments, as illustrated in FIG. 1, intermediate layer 16 can be substantially or fully encapsulated or contained between inner layer 12 and outer layer 14. Although preform 10 can comprise any one of a number of suitable shapes, in some embodiments, preform 10 can comprise a proximal end 18, having a threaded portion 20, a neck portion 22, a body portion 24, and an enclosed distal end portion 26.

In some embodiments, preform 10 can be arranged such that inner layer 12 and outer layer 14 are constructed of a similar or identical material, or in some embodiments inner layer 12 and outer layer 14 can be different materials. However, in some embodiments, inner layer 12 and outer layer 14 are made of PET. In some embodiments, intermediate layer 16, labelled B layer in FIGS. 4-7, is made of a hydrolytically unstable polymer, such as PGA. In some embodiments, intermediate layer 16 defines a cross-sectional thickness relative to inner layer 12 and outer layer 14, when viewed along a plane as illustrated in FIG. 1 or viewed orthogonal to a longitudinal axis of preform 10. In some embodiments, the cross-sectional thickness of intermediate layer 16 relative to an entire thickness of inner layer 12, outer layer 14, and intermediate layer 16 is in the range of 1 to 30%. In more preferred embodiments, it has been found that a thickness percentage of intermediate layer 16 in the range of 2-4% is effective.

In some embodiments, intermediate layer 16 is a blend of the hydrolytically unstable polymer and a material component, such as, but not limited to, a scavenger, a barrier, and the like.

In some embodiments, the blend of materials in intermediate layer 16 can comprise a 50-99 wt. % of hydrolytically unstable polymer and 1-50 wt. % of a material component. In some embodiments, the blend of materials in intermediate layer 16 can comprise a 75-90 wt. % of hydrolytically unstable polymer and 10-25 wt. % of a material component.

It has been found that a synergism exists when blending moisture-sensitive material components (e.g. scavenger materials) with PGA. Because PGA is hygroscopic, the PGA attracts moisture to the intermediate layer 16. Thus, the concept is usable to initiate $O_2$ scavenging by moisture in polymers having Tg near room temperature—the added moisture lowers Tg, making the polymer segments more mobile, and thus launches scavenging.

Moreover, there exists additional synergism with the use of a PGA/O2 scavenger in a removable layer. That is, there is a lower wt. % required for equivalent performance of the PGA/scavenger layer structure to that of a monolayer blend. The removal of non-PET material in the recycling process is potentially much greater compared with a monolayer blend.

With reference to FIGS. 4-7, comparative calculations of candidate structures (monolayer blend O2 scavenger vs. multilayer PGA blends) with specific layer loadings is provided showing projected barrier performance and end-of-life (EOL) residuals of non-PET material in the PET stream assuming various wash efficiencies. As can be seen, in each configuration tested, a multilayer configuration, as taught herein that uses inner layer 12 and outer layer 14, denoted by Layer A in the tables, with intermediate layer 16, denoted by Layer B in the tables, being made of hydrolytically unstable polymer provides unique benefits in recyclability not found in the prior art. Particularly, configurations where the intermediate layer 16 (Layer B) comprises a 10-25 wt. % scavenger and 75-90 wt. % PGA will provide substantially reduced ingress $O_2$ compared to monolayer or conventional multilayer configurations. Moreover, in each configuration, the residual of PGA and scavenger is shown to be substantially reduced (down to 1-10% following a wash processing step).

The use of a dye (or colorant, more generally) in the intermediate layer 16 may or may not be advantageous versus a monolayer dispersed colorant. The colorant system may comprise a UV blocker (to retain visually clear package or sheet material) or a colorant to tone, tint, color, or decorate the package or sheet, or a Near Infrared (NIR) absorber that is adjustable by layer placement and concentration. Unlike $O_2$ scavengers, the colorant is generally nonreactive and intended to be unchanged over time of article use. So its light-blocking (visible or UV or NIR) effectiveness is strictly proportional to Beer's Law control [A(lambda)=a(lambda)×b×C], where A is absorbance at a particular wavelength lambda, a is molar absorptivity of the colorant, b is the path length (layer thickness) and C the colorant concentration in the layer.

The colorant may be chosen according to its preferential solubility/compatibility with PGA "carrier" vs. any solubility in PET. A colorant that is a near-IR (reheat) absorber that is dispersed or dissolved in the PGA may be engineered via layer placement and absorber concentration to provide preferential heating during blow molding nearer to the middle or to the inside of a preform. A colorant may be used as a dye tracer for indicating removal of PGA at EOL during the recycle wash process. The removal of PGA will be indicated by the same Beer's Law relationship for a given flake thickness after recycle wash, where A(lambda) will be minimized for efficient wash process.

Finally, the following compatibilizers can be used to resist phase separation in two-component polymer blends: maleic anhydride (MAH), MAH-grafted functional polymers, glycidyl methacrylate group (GMA), GMA-grafted functional polymers, diblock copolymers, and nonreactive polar polymers.

Figure 2:
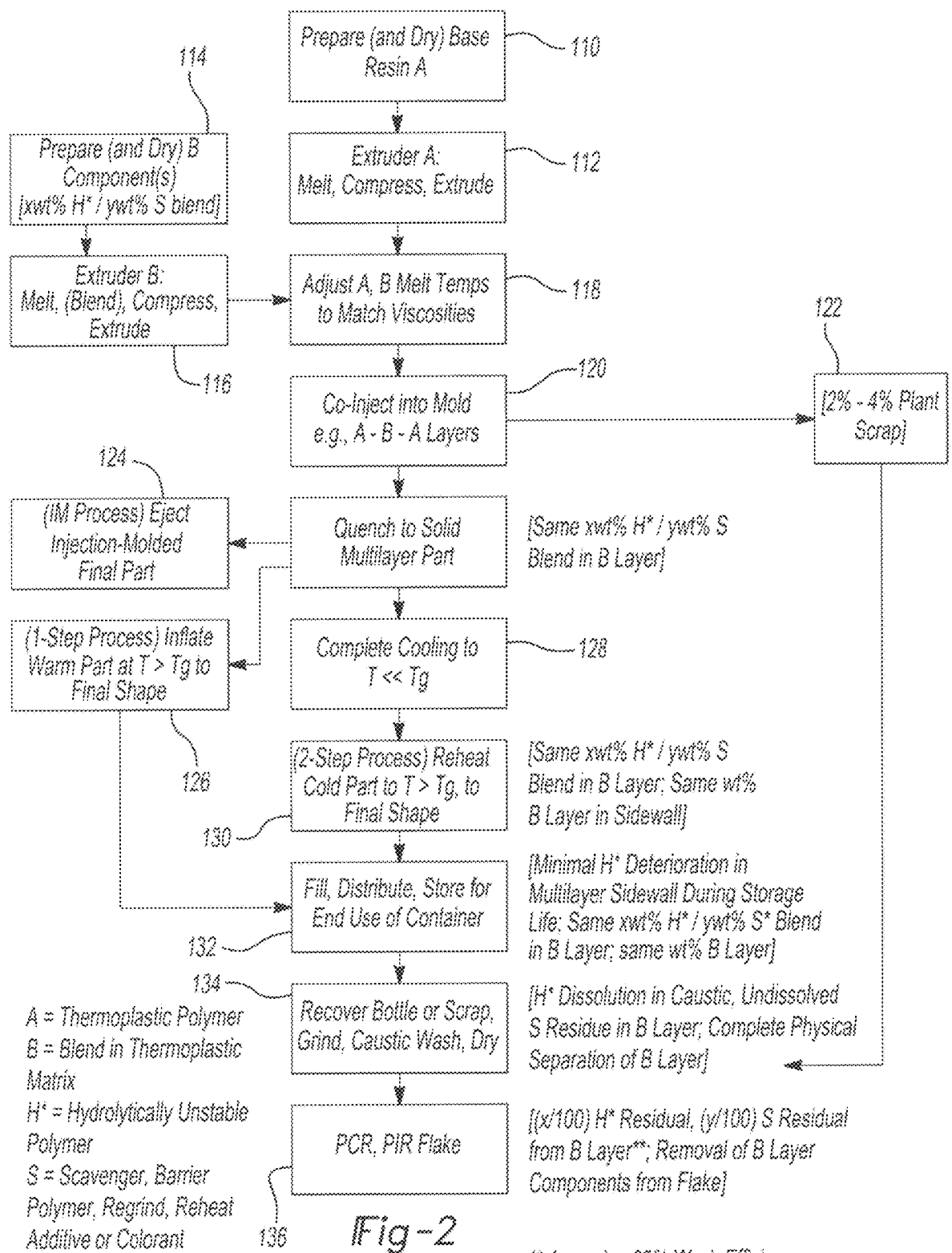
FIG. 2 is a schematic flowchart illustrating a method of manufacturing a container according to the principles and compositions of the present teachings.

In accordance with the principles of the present teachings, as illustrated in FIG. 2, preform 10 or any multilayer thermoplastic article can be formed by preparing a base resin A at 110 and melting, compressing, and extruding A at 112. B components, defining the material of intermediate layer 16, can be prepared in accordance with the wt. % set forth herein at 114. B can then be melted (blended), compressed, and extruded at 116. Extrusion A and B can be coextruded and adjusted (e.g. via temperature) to provide a predetermined extrusion condition (e.g. viscosity) at 118. This combined extrusion of A and B can be co-injected into a mold in a desired orientation, such as A-B-A (i.e. inner layer 12, intermediate layer 16, and outer layer 14, respectively) at 120. Any scrap material (e.g. 2-4% scrap) can be recovered and added to the recycle stream at 122 and benefit from the principles of the present teachings due to the blended composition of the scrap matching that of the present inventive teachings. The quenched co-injected article, having the blended composition as set forth herein, can be processed at 124 or immediately inflated or blow molded to the final desired shape (at a temperature above the glass transition temperature Tg) at 126. Alternatively, the co-injected article can be cooled to below the glass transition temperature Tg at 128. If cooled, the preform 10 can be later heated to above the glass transition temperature and inflated or blow molded to the final desired shape at 130. It should be understood that each of the co-injected items (e.g. co-injected article or strap materials) comprises an intermediate layer being made of hydrolytically unstable polymer and a material component and, thus, can be easily recycled at any stage of manufacture or post consumption. Particularly, the co-injected article can be filled, distributed, and stored for end use of the container at 132 and then recovered for recycling. The recovered product or strap can be then ground and placed in a caustic wash to dissolve the hydrolytically unstable polymer of the intermediate layer 16 and completely separate the material component of the intermediate layer from the thermoplastic material of the inner layer 12 and/or outer layer 14 and later dried at 134, finally resulting in PCR, PIR flakes at 136.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multilayer coextruded preform for blow molding a thermoplastic container comprising:
   an inner layer being made of Polyethylene Terephthalate (PET) material;
   an outer layer being made of Polyethylene Terephthalate (PET) material; and
   an intermediate layer coextruded between the inner layer and the outer layer to form the multilayer coextruded preform, the intermediate layer being made of a blended material comprising 50 to 99 wt. % of a hydrolytically unstable polymer and 1 to 50 wt. % of an oxidizable organic polymer,
   wherein the multilayer coextruded preform is adapted to be blow molded to a final desired shape of the thermoplastic container.

2. The multilayer thermoplastic article according to claim 1, wherein the oxidizable organic polymer is selected from the group consisting of polybutadiene, oxidizable polyamide materials, or poly(alkylene ether), PTMEG; unsaturated hydrocarbons, MXBT, and m-xylylene-bis-(tetrahydrophthalimide).

3. The multilayer thermoplastic article according to claim 1, wherein the hydrolytically unstable polymer is Polyglycolic Acid (PGA).

4. The multilayer thermoplastic article according to claim 1, wherein the hydrolytically unstable polymer is selected from the group consisting of polycaprolactone (PCL), polydioxanone (PDO), polyglycolide trimethylene carbonate (PGA TMC), DL-polylactide-co-glycolide (DLPLG).

5. The multilayer thermoplastic article according to claim 1, wherein a melt temperature of the hydrolytically unstable polymer is substantially equal to the melt temperature of the oxidizable organic polymer.

6. The multilayer thermoplastic article according to claim 1, wherein a cross-sectional thickness of the intermediate layer is in the range of 1 to 30% of the total thickness of the inner layer, the outer layer, and the intermediate layer.

7. The multilayer thermoplastic article according to claim 1, wherein a cross-sectional thickness of the intermediate layer is in the range of 2 to 4% of the total thickness of the inner layer, the outer layer, and the intermediate layer.

8. The multilayer thermoplastic article according to claim 1, wherein the blended material comprises 75 to 90 wt. % of a hydrolytically unstable polymer and 10 to 25 wt. % of the oxidizable organic polymer.

9. The multilayer thermoplastic article according to claim 1, wherein the intermediate layer further comprises a compatibilizer.

10. The multilayer thermoplastic article according to claim 9, wherein the compatibilizer is selected from the group consisting of maleic anhydride (MAH), MAH-grafted functional polymers, glycidyl methacrylate group (GMA), GMA-grafted functional polymers, diblock copolymers, and nonreactive polar polymers.

* * * * *